No. 674,654. Patented May 21, 1901.
J. H. McTAGUE.
MEANS FOR CHECKING.
(Application filed Jan. 7, 1901.)
(No Model.)

UNITED STATES PATENT OFFICE.

JAMES H. McTAGUE, OF ST. LOUIS, MISSOURI.

MEANS FOR CHECKING.

SPECIFICATION forming part of Letters Patent No. 674,654, dated May 21, 1901.

Application filed January 7, 1901. Serial No. 42,338. (No model.)

*To all whom it may concern:*

Be it known that I, JAMES H. MCTAGUE, of the city of St. Louis, State of Missouri, have invented certain new and useful Improvements in Means for Checking, of which the following is a full, clear, and exact description, reference being had to the accompanying drawings, forming a part hereof.

This invention relates to means for checking; and it consists of the novel features hereinafter shown, described, and claimed.

One object of this invention is to provide an improved means for checking for use in all places where meals or any kind of refreshments are served, and by means of which an absolutely accurate account of all orders may be kept and every person who assists in serving the order may be identified, thereby enabling the proprietor to tell with absolute accuracy the amount of business done and the profits in a given time and avoid any loss which might occur through the dishonesty or fault of an employee.

Another object is to provide an improved check having a deleble coating contrasting in color to the body of the check, so that no erasure can be made without marring the surface of the check, thereby making such change or alteration manifest to the eye.

In the drawings I have shown a check constructed in accordance with the principles of my invention. The different figures show the check in the several stages or steps through which it passes from the time it is issued to the waiter until it is returned after the order has been filled.

Figure 1 shows the complete check before being issued to the waiter. Fig. 2 shows the upper stub detached, the body of the check and the lower stub being delivered to the waiter. Fig. 3 is a view showing the check with the complete order filled and the cost of each article as indicated by the waiter while taking the order. Fig. 4 shows the check with the lower stub detached and the body of the check containing the orders with the total cost and the individual punch-marks of each department. Fig. 5 is a view showing an order partially erased, the body of the check showing where the erasure was made in contrast to the deleble coating.

As shown, the check is made in three parts or divisions, of which two are in duplicate, and these duplicate parts are at the ends of the main or central portion and are the stubs by which the check is identified and by which the name or number of the waiter or employee serving the order may be ascertained. By this system any loss or inaccuracy in the order may always be charged to the party at fault, which is equally just both to the employer and to the employee. The contrasting deleble coating renders it impossible to make any change either in the order or the price charged, so that neither the employer nor the customer can be defrauded or suffer loss through the dishonesty or fault of the employee without becoming aware of the fact.

Referring more particularly to the drawings, 1 indicates the main or central portion of the check, which is divided into a number of divisions by a series of ruled lines. At the upper extremity of this main or central portion is a transverse space 2, adapted to contain the name of the establishment using the check and to receive in stamp or otherwise the date at which the check is used or issued. If desired, other matter may be printed within this space; but it is thought that suggested will be found most convenient and give greater assistance in using the check. Another horizontal space 3 is provided below the space just described, and this space is divided into a number of divisions corresponding to the number of departments pre-sided over by the proprietor, and the name of each department is printed in the space allotted to it. These spaces are provided for the reception of the rebates, if any, arising from what is commonly termed "No sale or exchange"—that is to say, if a customer gives an order and it is taken down on the check by the waiter, together with the cost, and after the order is served the customer finds it unsuitable or undesirable and returns it with another order, the price of the first order is stamped in the space adapted to receive the rebate from the department in which the order was served. In such instance the words "No sale" or other words of like import are stamped over the order to show that no price was received for the order. All this is done before the new order is served and before the check and the amount of money received are finally handed in to the cashier or other person whose duty it is to receive them. This "No sale" order is not erased from the check for the reason, as stated above, that the deleble coating would be marred and it would then appear that an attempt had been made by the waiter or some other party to change the order or defraud the customer or employer. Thus it is seen that all rebates must be indicated on the check on which the order is contained and that any change either in the order or its cost can be at once detected. Below these rebate divisions are other divisions 4—one to receive the name or number of the waiter, another to receive a numeral indicating the number of guests served, and another space containing the serial number of the check. Other divisions may be arranged to receive such matter as it may be desired to print on the check. Below these divisions is a series of spaces to receive the orders, which are written intermediate of the edges of the card, so that the cost or price can be indicated at each side. A vertical column 5 is provided near the left side of the check to receive the number of the articles ordered, and immediately to the left of this column is another column 6, adapted to receive in stamp the cost of the articles. It may be well to mention in this connection that the check is designed for use in combination with a cash-register or stamping-machine, the prices being stamped in the column 6 by the register-checker, as are also the rebates in the divisions of the space 3. As the waiter takes an order the names of the articles ordered are written in the horizontal spaces on the body of the check and their cost is indicated at their right, adjacent to the edge of check, as shown in Figs. 3 and 4. Before serving the order the waiter delivers the check to the checkers of the different departments from which articles are ordered, who punch the check with the individual punches of those departments, and then he delivers the check to the restaurant-checker, who stamps thereon in the column 6 the prices of the articles ordered. This maintains a balance near each side of the check, and after the order is served the total cost is written under the column of figures at the right, as shown in Fig. 4. To assist in maintaining a separate account for each department, the cost of the orders for the several departments is stamped in different colors by the person operating the register. For example, the orders from the bar are stamped in red ink, those from the restaurant in black ink, and so on, each department having a distinguishing color, whereby one is enabled to discern without difficulty the amount of business done in each of the said departments. The check is also punched adjacent to each order before the prices are stamped in the manner described, different punches for different departments being used to assist in maintaining the distinct accounts and avoid confusion. (See Fig. 4.)

Near the upper end of the check is a series of alined perforations 7, extending transversely across the check and forming a detachable stub 8, upon which is printed the serial number of the check, which is the same as the number on the body of the check and which I have referred to above. Also the name or number of the waiter is stamped thereon when the check is issued, as it is on the body of the check in the space 4. The amount received or charged for the orders is also written thereon after the orders have been served and the total cost ascertained. This stub is detached when the check is issued to the waiter by the restaurant-checker and placed with the stubs of the other checks issued to that waiter, which collectively represent the checks which have been issued to him and the amount charged against him, a fixed charge being made against the waiter for each check issued to him, and this charge is only removed when the checks corresponding to these stubs are returned, together with the amount charged, to the cashier, unless the customer had the amount charged or credited to him. Another line of perforations 9 is near the bottom of the check, and they form a stub 10 corresponding to the stub 8 and which contains the same matter as is printed or written on the said stub 8—viz., the serial number of the check, the name or number of the waiter, and the amount received or charged. This stub is not detached until after the orders have been served and the amount received has been paid to the cashier who receives the money in payment for the checks, at which time the cashier folds the stub over upon the check and punches through both stub and check a punch-mark 11, known as the "cashier's" punch-mark, and then removes the stub and returns it to the waiter, to whom it is a conclusive receipt that the check represented by that stub has been paid, as represented by the cashier's punch-mark. This receipt further allows the waiter to return it to the restaurant register-checker with punch-marks 11 of the cashier, showing that that check has been paid, and this lower stub checks off against the charge made against the waiter when the check was issued and which the restaurant-checker holds against the waiter. This governs all the waiters employed, so that they are allowed to go off duty only when the lower stubs of the checks are marked with the punch-mark 11, as shown in Fig. 4; but if the waiter should return to the restaurant register-checker any stub 10 which has not been punched by the cashier's punch-mark 11 he is not allowed to go off duty until he produces a stub punched with the cashier's mark 11 and corresponding to the stub charged against him. The object of this is to prevent any waiter employed from going off duty while having in his possession any money or checks of the proprietor. This system has been devised to enable the proprietor to settle his account with the waiter at any time, the custom in large establishments at present being to count the checks the day following their usage, which prevents knowing the losses, if any, at the time.

The checks are issued in sequential order, a fixed number being issued to each waiter, so that it can be easily ascertained if all the checks are returned, and if any checks are lost the shortage can be charged to the party at fault.

The checks are issued in fixed numbers of fives, tens, fifteens, or twenties consecutively, beginning with "1" and ending with "5" through units, tens, hundreds, and thousands, never issuing less than five at a time to any one waiter. As an example, the serial number of the check shown in the drawings is "91401," the first of a series of five, and the last of this series would of course be "91405," if issued in a series of five. The first of the next series then would be "91406," and if issued in a series of five the last would be "91410," or if issued in tens the last would be "91415," and so on indefinitely, no series ever being broken. This suggests itself as being an infallible protection against any collusion of the waiter and restaurant-checker, who is the custodian of the top stubs 8 of the checks issued and which represent the charges against the waiter. Now if the checks were issued at random and without regard to number it would be possible for the waiter to enter into collusion with the restaurant-checker to call for the top stub of a check and destroy it and retain the amount received for the orders served, leaving no evidence that that check ever existed, and when the checks are counted, even if it appears that one is missing, it cannot be ascertained to whom it was issued; but by issuing in consecutive series, as explained above, it can be easily ascertained to what waiter the missing check was issued by referring to the check either above or below the missing check in the series. This question has been dealt with in many ways in different establishments, entailing a great deal of work and not insuring such absolute protection as this simple system does.

This check and the system by which it is used avoid all possibility of mistake on the part of any of the employees and effectually protects both the employer and the customer against all loss by carelessness or dishonesty on the part of the employee.

The check has been used with entire satisfaction and, as stated, fully protects the employer, employee, and customer and has been found much more satisfactory than any form of check heretofore used.

I claim—

An improved check consisting of a main or central portion having a deleble coating of a contrasting color covering its front side, a ruled column thereon adapted to receive the names of the articles ordered, a second column to the right thereof for the insertion of the prices of the different articles, a third column to the left of the ruled column and adapted to receive in stamp the prices of the articles, the said central portion having its serial number printed thereon outside the columns mentioned, a detachable identification-stub carried by the upper end of the central portion and having the serial number thereon, the said stub being designed to identify the check when returned after the orders have been served, and a second stub, a duplicate of the first-mentioned stub, detachably carried by the lower end of the main or central portion and to be a receipt to the waiter after the orders have been served and the check returned.

In testimony whereof I affix my signature in presence of two witnesses.

JAMES H. McTAGUE.

Witnesses:
ROBERT W. THOMPSON,
HARRY H. BOSS.